United States Patent
Matsubara et al.

(10) Patent No.: US 11,216,093 B2
(45) Date of Patent: Jan. 4, 2022

(54) SYSTEMS, APPARATUS, AND METHODS FOR DETECTING COMPUTING DEVICE INPUTS BY A POINTING BODY

(71) Applicant: LENOVO (Singapore) PTE. LTD., New Tech Park (SG)

(72) Inventors: Masaki Matsubara, Yokohama (JP); Norihito Ozeki, Yokohama (JP); Thi Xuan Mai Tran, Yokohama (JP); Markus Takashi Heberlein, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/004,924

(22) Filed: Aug. 27, 2020

(65) Prior Publication Data

US 2021/0064157 A1 Mar. 4, 2021

(30) Foreign Application Priority Data

Aug. 28, 2019 (JP) .............................. JP2019-155922

(51) Int. Cl.
*G06F 3/01* (2006.01)
*G06F 3/041* (2006.01)

(52) U.S. Cl.
CPC .............. *G06F 3/041* (2013.01); *G06F 3/016* (2013.01); *G06F 2203/04105* (2013.01)

(58) Field of Classification Search
None
See application file for complete search history.

(56) References Cited

U.S. PATENT DOCUMENTS

2010/0271326 A1* 10/2010 Hu ........................ G06F 3/0414
345/174
2015/0084874 A1* 3/2015 Cheng ................. G06F 3/04883
345/173

FOREIGN PATENT DOCUMENTS

| JP | 2002323955 A | 11/2002 |
| JP | 2004348739 A | 12/2004 |
| JP | 2011-048409 A | 3/2011 |

* cited by examiner

*Primary Examiner* — Carl Adams
(74) *Attorney, Agent, or Firm* — Kunzler Bean & Adamson

(57) ABSTRACT

Methods, systems, and apparatus that detect computing device inputs by a pointing body are disclosed. One method includes detecting user inputs based on a received set of physical touches of a pointing body pressing an operation surface of a computing device indicating a pressed state of the operation surface detected by a pressure sensor, detecting a make event comprising a first physical touch including a first pressure value that is greater than or equal to a make threshold pressure value based on the detected user inputs, and utilizing a first threshold as the make threshold for use in detecting a first round of the make event and a second threshold, which is less than the first threshold, as the make threshold for use in detecting subsequent rounds of the make event within a first predetermined multi-click detection period of time. Systems and apparatus for performing the method are also disclosed.

20 Claims, 10 Drawing Sheets

SYSTEMS, APPARATUS, AND METHODS FOR DETECTING COMPUTING DEVICE INPUTS BY A POINTING BODY

REFERENCE TO RELATED APPLICATION

This application claims priority to Japanese Patent Application No. JP2019-155922, filed on Aug. 28, 2019, the contents of which are incorporated herein by reference, in their entirety.

FIELD

The subject matter disclosed herein relates to computing systems and devices and, more particularly, relates to systems, apparatus, and methods for detecting computing device inputs by a pointing body.

BACKGROUND

Conventional input devices (e.g., a touch screen of a tablet terminal, a flat type keyboard without key traveling, or a touch-type operation switch without keystroke) include an actuator built into the input device. The actuator is driven in response to a user's input operation to give the user a tactile feedback (e.g., haptic feedback).

Japanese Patent Application Publication No. 2011-48409, for example, discloses an input device configured to vibrate a touch surface of a touch sensor to give an operator a click feeling upon detecting a pressure load on the touch sensor that satisfies a first condition. The touch surface of the touch sensor also vibrates to give the operator a release feeling from the click feeling upon detecting that the pressure load on the touch sensor satisfies a second condition.

For example, with respect to an input device mounted on a laptop personal computer (PC), a tablet terminal, a game console, or the like, there is a multi-click operation (e.g., a double-click operation, a triple-click operation, or the like operation) in which multiple clicks are continuously input, as one of the operations. In some cases, users can become fatigued having to perform one or more multi-click operations.

BRIEF SUMMARY

Various embodiments provide systems and apparatus that detect computing device inputs by a pointing body. One system includes a pressure sensor configured to detect a set of physical touches indicating a pressed state of a pointing body on an operation surface of a computing device and a controller configured to detect inputs of the pointing body based on the set of physical touches indicating the pressed state detected by the pressure sensor. The controller includes a make event detector configured to detect a make event including a first physical touch including a first pressure value that is greater than or equal to a make threshold pressure value based on the detected user inputs and the make event detector utilizes a first threshold as the make threshold for use in detecting a first round of the make event and utilizing a second threshold, which is less than the first threshold, as the make threshold for use in detecting subsequent rounds of the make event within a first predetermined multi-click detection period of time.

An apparatus includes a processor of an information handling device and a memory configured to store code executable by the processor. The executable code causes the processor to detect user inputs based on a received set of physical touches of a pointing body pressing an operation surface of a computing device indicating a pressed state of the operation surface detected by a pressure sensor, detect a make event comprising a first physical touch including a first pressure value that is greater than or equal to a make threshold pressure value based on the detected user inputs, and utilize a first threshold as the make threshold for use in detecting a first round of the make event and a second threshold, which is less than the first threshold, as the make threshold for use in detecting subsequent rounds of the make event within a first predetermined multi-click detection period of time.

Other embodiments provide methods for detecting computing device inputs by a pointing body. One method includes detecting, by an information handling device, user inputs based on a received set of physical touches of a pointing body pressing an operation surface of a computing device indicating a pressed state of the operation surface detected by a pressure sensor, detecting a make event comprising a first physical touch including a first pressure value that is greater than or equal to a make threshold pressure value based on the detected user inputs, and utilizing a first threshold as the make threshold for use in detecting a first round of the make event and a second threshold, which is less than the first threshold, as the make threshold for use in detecting subsequent rounds of the make event within a first predetermined multi-click detection period of.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
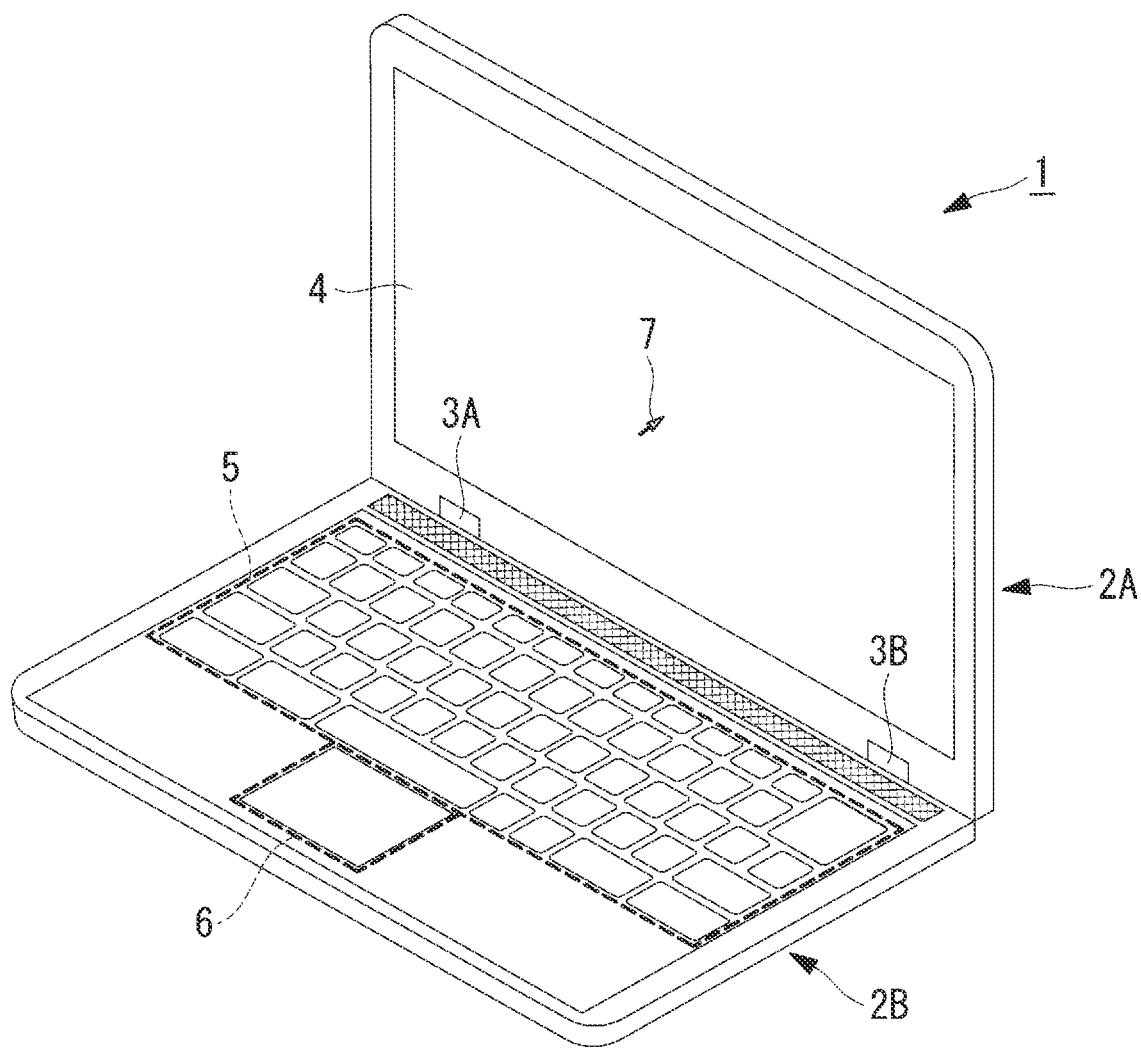
FIG. 1 is a schematic diagram illustrating an external view of one embodiment of a laptop personal computer (e.g., an information handling device)

As will be appreciated by one skilled in the art, aspects of the embodiments may be embodied as an apparatus and/or a system. Accordingly, embodiments may take the form of an entirely hardware embodiment or an embodiment combining hardware and software aspects that may all generally be referred to herein as a "circuit," "module" or "system."

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present technology solves at least some of the issues discussed above in the Background section. Specifically, the various embodiments disclosed herein provide an input device and an input detection method thereof capable of reducing the feeling of fatigue experienced by a user when a multi-click operation is performed.

An input device, according to various embodiments, includes a pressure sensor configured to detect a physical quantity of touches indicating a pressed state of a pointing device on an operational surface and a controller configured to detect an input on the basis of a physical quantity of touches indicating the pressed state detected by the pressure sensor. In certain embodiments, the controller includes a make event detector configured to detect a make event in the case where the physical quantity of touches is greater than or equal to a threshold quantity of touches and the make event detector uses a first threshold of touches as a make threshold for use in detecting a first round of a make event and uses a second threshold of touches, which is smaller than the first threshold of touches, as another make threshold for use in detecting second and subsequent rounds of make events in the case of detecting a plurality of make events within a predetermined multi-click detection period. An information processing apparatus according to various embodiments includes the above-described input device.

An input detection method according to various embodiments, which is intended for an input device configured to include a pressure sensor that detects a physical quantity of touches indicating a pressed state of a pointing device on an operational surface, includes a computing device (e.g., an information handling device) detecting a make event in response to a physical quantity of touches being greater than or equal to a make threshold of touches. In certain embodiments, the computer uses a first threshold of touches as a make threshold for use in detecting a first round of a make event and uses a second threshold of touches, which is smaller than the first threshold of touches, as a second make threshold for use in detecting second and subsequent rounds of make events in the case of detecting a plurality of make events within a predetermined multi-click detection period of time. The above-described aspects of the various embodiments can reduce a user's feeling of fatigue when performing multi-click operations.

Input devices and input detection methods thereof according to various embodiments are described below with reference to the appended drawing figures. Although the following embodiments describe a case in which an input device is included in a laptop personal computer (PC), which can be considered an information processing apparatus and/or an information handling device, the various embodiments are not limited tom laptop PCs. That is, the input device(s) and the input detection method(s) can be applied to other computing devices that provide a human-machine interface and/or interaction.

Additionally, although the following embodiments describes a pressure-sensitive touchpad as an example of an input device, an input device is not limited thereto, and any input device may be used provided that the input device includes a multi-click function as an input operation. For example, a pressure-sensitive touch display may be used as the input device.

Turning now to the figures, FIG. 1 is a schematic diagram illustrating an external view of one embodiment of a laptop PC 1. At least in the illustrated embodiment, the laptop PC 1 includes, among other components, a display side chassis 2A and a main body side chassis 2B, both of which include a substantially rectangular shape.

The display side chassis 2A includes a display 4 configured to display images. The display side chassis 2A and the main body side chassis 2B are connected, for example, by a pair of left and right connecting parts 3A and 3B at their respective ends. In certain embodiments, the connecting parts 3A and 3B include hinges, which support the display side chassis 2A and the main body side chassis 2B so that the display side chassis 2A and the main body side chassis 2B can be opened and closed.

In various embodiments, the main body side chassis 2B includes, among other components, a flat keyboard 5 and a pressure-sensitive touchpad 6 as input devices. A keyboard is not limited to the flat keyboard 5 exemplified in this embodiment and may include a keyboard device including multiple physical keys arranged so that the physical keys can move down and up when pressed/depressed.

The flat keyboard 5, in some embodiments, includes a panel with a touch sensor 27 (see, FIG. 3) that displays images indicating a plurality of key positions in which inputs of characters, commands, or the like are accepted. The flat keyboard 5 is configured to have no or little, if any, keystrokes.

In various embodiments, the pressure-sensitive touchpad 6 includes an area for performing pointing and tapping operations (e.g., a click operation, a double-click operation, a triple-click operation, and the like operation(s)) to move a pointer 7 displayed on the display 4. The pressure-sensitive touchpad 6 illustrated in FIG. 1 is displayed in a rectangular shape, but the shape is not limited thereto, and other shapes may be used. The pressure-sensitive touchpad 6 is provided on the lower side (e.g., a user side) of the flat keyboard 5 on the surface of the main body side chassis 2B; however, the location is not limited thereto. For example, the pressure-sensitive touchpad 6 may be provided on the right or left side of the flat keyboard 5. The pressure-sensitive touchpad 6 is configured to have no or little, if any, keystrokes similar to the flat keyboard 5.

Figure 2:
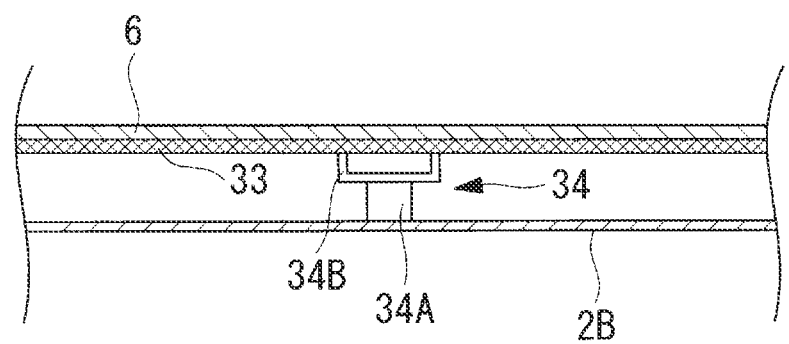
FIG. 2 is a block diagram illustrating a vertical cross-section of one embodiment of a main body chassis and a touchpad in the laptop personal computer (PC) of FIG. 1.

FIG. 2 is a schematic diagram of a vertical cross-section of one embodiment of the main body side chassis 2B including the pressure-sensitive touchpad 6. As illustrated in FIG. 2, for example, the pressure-sensitive touchpad 6 includes a pressure sensor 33 provided on the back of the operation surface (e.g., a chassis surface) and a haptic device 34 provided on an underside of the pressure sensor 33.

The haptic device 34, in various embodiments, includes a feedback unit and/or device that provides feedback (hereinafter, referred to as "haptic feedback") to the tactile sensation of a user's finger or the like and is equipped with, for example, an actuator 34A that causes vibration. The actuator 34A, according to various embodiment, in configured to transmit the vibration(s) to the pressure-sensitive touchpad 6 in response to a user's input to the pressure-sensitive touchpad 6. The user perceives the vibration(s) with his/her finger, which gives the user the illusion, sensation, and/or impression that the user has actually pressed the pressure-sensitive touchpad 6.

In various embodiments, the actuator 34A is configured to provide vibration of a constant or substantially constant amplitude to a vibrating body 34B for a predetermined amount of time. The actuator 34A may include, for example, an eccentric rotating mass (ERM) actuator that uses an eccentric motor, a linear resonant actuator (LRA) that vibrates a mover by applying an alternating current to a coil in a magnetic field, an actuator using a shape memory alloy (e.g., a shape memory alloy impact actuator (SIA)), and an actuator using a piezoelectric element (e.g., a piezo element, a piezo vibration actuator (PVA), etc.), among other actuators that are possible and contemplated herein. Although the haptic device 34 illustrated in FIG. 2 is shown as a single haptic device in the approximate center of the pressure-sensitive touchpad 6, the quantity of installed haptic devices 34 and their respective locations are not limited to this embodiment. For example, a plurality of haptic devices 34 may be provided. Furthermore, the haptic devices 34 may be provided with one haptic device 34 located at each of the four corners inside the main body side chassis 2B.

Figure 3:
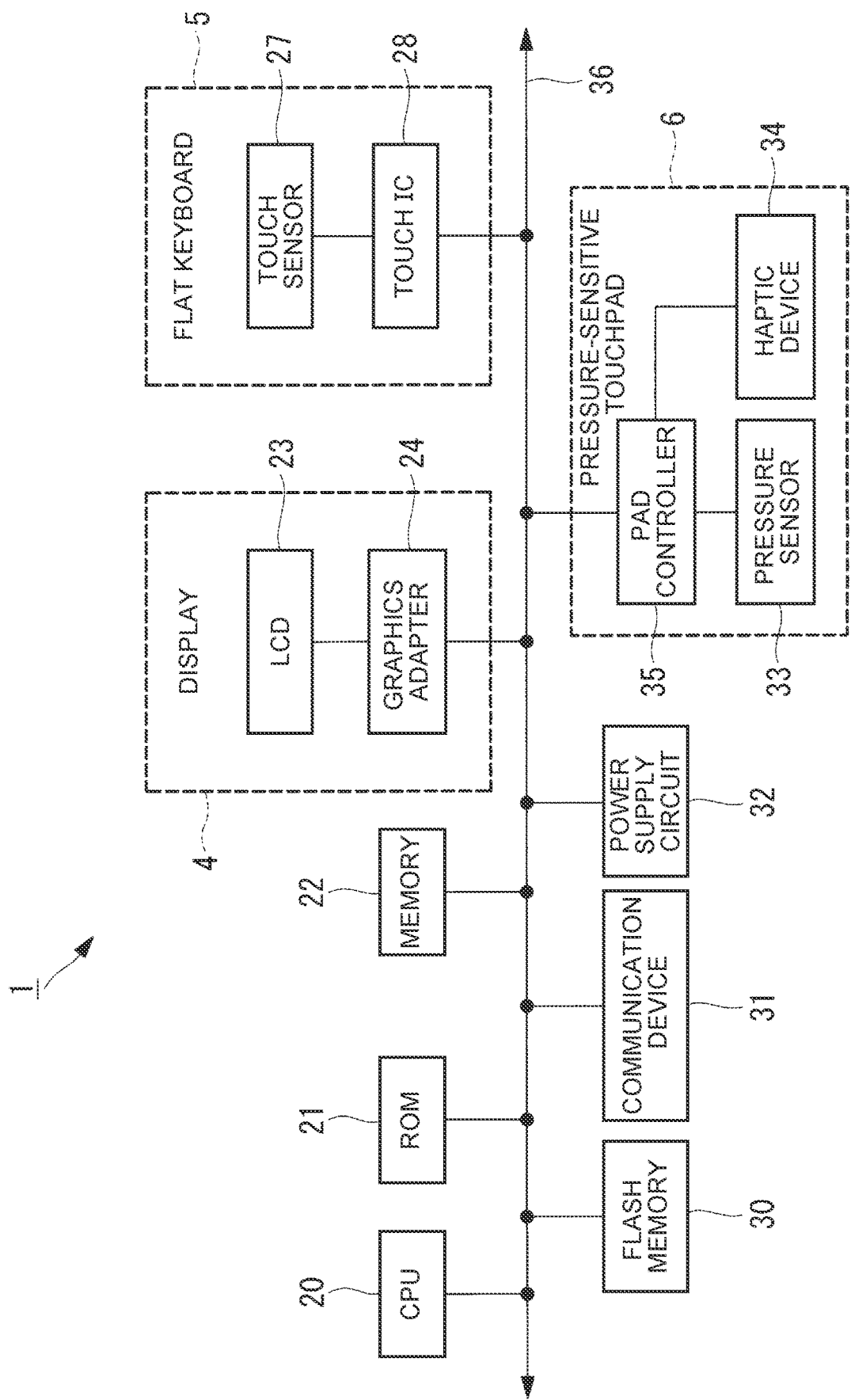
FIG. 3 is a schematic block diagram illustrating one embodiment of a hardware configuration of the laptop PC of FIG. 1.

FIG. 3 is a diagram illustrating one embodiment of a hardware configuration of a laptop PC 1. In addition to the display 4, the flat keyboard 5, the pressure-sensitive touchpad 6 described above, the laptop PC 1 includes, among other components, a central processing unit (CPU) 20, a read-only memory (ROM) 21, a memory 22, a flash memory 30, a communication device 31, a power supply circuit 32, and the like components, and the respective units are connected directly or indirectly via a bus 36.

In various embodiments, the display 4 is configured to include, among other components, a liquid crystal display (LCD) 23 and a graphics adapter 24. Under the control of the CPU 20, the graphics adapter 24 is configured to convert image information/data to a video signal and output the converted video signal to the LCD 23. The LCD 23 displays the video signal received from the graphics adapter 24 as an image under the control of the CPU 20.

The flat keyboard 5 is configured to include, among other components, a touch sensor 27 and/or a touch IC 28. In various embodiments, the touch sensor 27 is configured to detect, for example, a physical quantity of touches indicating the pressed state of a user's finger or the like on the flat keyboard 5 and output a detection signal related to a pressed position and a pressed state to the touch IC 28. The touch sensor 27 may include, for example, a capacitance type, a resistance film type, or an electromagnetic induction type of touch sensor, among other types of touch sensors that are possible and contemplated herein.

The touch IC 28 is configured to perform various processes based on the detection signal input from the touch sensor 27 via a processor executing a program stored in the ROM 21 or the like memory device(s). The pressure-sensitive touchpad 6 is configured to include, among other components, a pressure sensor 33, a haptic device 34, and a pad controller 35.

In various embodiments, the pressure sensor 33 is configured to detect a physical quantity of touches indicating the pressed state of a user's finger (e.g., a pointing body) on the operation surface (e.g., a chassis surface) of the pressure-sensitive touchpad 6 and output a detection signal related to the physical quantity of touches to the pad controller (e.g., a controller) 35. The pressure sensor 33 is further configured to detect, for example, a pressure value corresponding to the pressed state of a user's finger or the like. In other words, the pressure sensor 33 is configured to detect a contact pressure (e.g., click-down pressure) on the operation surface and then output a detection signal related to the detected pressure value to the pad controller 35.

The pad controller 35, in various embodiments, includes a processor. The processor is configured to execute a set of programs stored in the ROM 21, the flash memory 30, or the like memory device(s) to perform various processes based on a detection signal input from the pressure sensor 33. For example, the pad controller 35 is configured to receive the detection signal from the pressure sensor 33 and, in response thereto, output a signal for driving the haptic device 34 to the haptic device 34.

The CPU 20 is configured to control the laptop PC 1 via an operating system (OS) stored in the flash memory 30 that is connected and/coupled to the CPU 20 via the bus 36. Further, the CPU 20 is configured to perform a set of processes based on information/data from the input device (e.g., the flat keyboard 5 and/or the pressure-sensitive touchpad 6) on the basis of various programs stored in the flash memory 30.

The ROM 21 stores a basic input/output system (BIOS), various data, and the like. The memory 22 includes, among other components, a cache memory and/or a random-access memory (RAM). The memory 22 further includes a writable memory used as a work area for reading an execution program of the CPU 20 and writing processing data by the execution program.

The flash memory 30 stores, among other data, a multi-window OS for controlling the laptop PC 1, various drivers for operating hardware of peripheral devices, utility programs, various application programs, and the like. The laptop PC 1 may include another storage section, such as a hard disk drive (HDD), as a storage section and/or device that is in addition or an alternative to the flash memory 30.

The communication device 31 is configured to communicate with one or more other devices. Further, the power supply circuit 32 includes an Alternating Current (AC) adapter, a battery, a charger for charging the battery, and a Direct Current-to-Direct Current (DC-DC) converter or the like and is configured to supply electric power to the respective devices under the control of the CPU 20.

Figure 4:
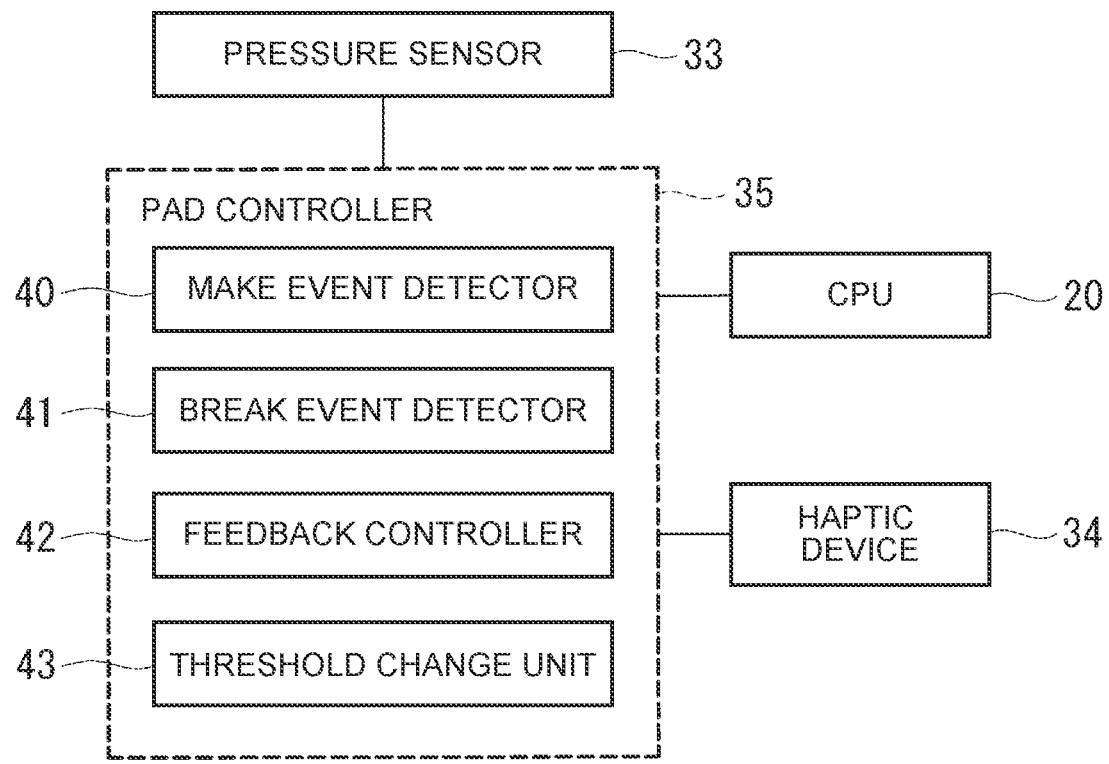
FIG. 4 is diagram illustrating one embodiment of a functional configuration related to an input detection function of the laptop PC of FIG. 1.

FIG. 4 is a functional configuration diagram schematically illustrating one embodiment of a functional configuration related to an input detection function of the laptop PC. The processes for implementing various functions described below are stored in a computer-readable recording medium (e.g., a non-transitory computer-readable storage medium) in the form of a program. The program is read to the memory 22, such as the RAM, and is executed by a processor mounted at least on the pad controller 35 or on the CPU 20, in which various functions are implemented.

The program may be previously installed in the ROM 21, the flash memory 30, or other storage media, and may be provided in the state of being stored in a computer-readable storage medium or may be distributed through a wired or wireless communication section. The computer-readable storage medium may include a magnetic disk, a magneto-optical disk, a CD-ROM, a DVD-ROM, a semiconductor memory, or the like.

Although the following description is made with reference to an example situation in which the pad controller 35 performs input control of the pressure-sensitive touchpad 6, the various embodiments are not limited thereto. For example, at least one processor included in the laptop PC 1 executes a predetermined program (e.g., an input detection program) to implement the various functions disclosed below. That is, the following various functions may be implemented by the cooperation of the pad controller 35 and the CPU 20 or the following functions may be implemented by the cooperation of the pad controller 35 and one or more other processors.

At least in the embodiments illustrated in FIG. 4, the pad controller 35 includes, among other components, a make event detector 40, a break event detector 41, a feedback controller 42, and a threshold change unit 43. Additionally, the pad controller 35 is configured to output an input signal corresponding to the user's input operation to the CPU 20.

In various embodiments, the make event detector 40 is configured to determine and/or detect a make event, which includes an event at the time when a user's finger (e.g., pointing body) presses the pressure-sensitive touchpad 6 and a pressure value is detected by the pressure sensor 33. Specifically, the make event detector 40 is configured to detect a make event in situations in which the pressure value from the pressure sensor 33 is greater than or equal to a make threshold pressure value.

In additional or alternative embodiments, the break event detector 41 is configured to determine and/or detect a break event, which includes an event at the time when a user's finger is separated from the pressure-sensitive touchpad 6 and a pressure value is detected by the pressure sensor 33. Specifically, after the make event is detected, the break event detector 41 detects a break event in which the pressure value from the pressure sensor 33 is less than or equal to a break threshold pressure value, which is a pressure value less than or equal to the make threshold pressure value. The make threshold and the break threshold pressure values are parameters that can be set and/or changed by the threshold change unit 43, the details of which are discussed elsewhere herein.

In various embodiments, the feedback controller 42 is configured to activate the haptic device 34 according to a make event and/or a break event. The time when the haptic device 34 vibrates is set to be an appropriate amount of time for a user to feel/sense the click. Note that the haptic device 34 may be activated in response to a make event.

The threshold change unit 43, in various embodiments, is configured to set and/or change the make threshold pressure value, which is used by the make event detector 40, and the break threshold pressure value, which is used by the break event detector 41. For example, the threshold change unit 43 includes an initial pressure value (e.g., Pm1) for the make threshold pressure value and an initial pressure value (e.g., Pb1) for the break threshold pressure value. At the time of booting the laptop PC 1, the threshold change unit 43 sets the initial make pressure value Pm1 as the make threshold pressure value and sets the initial break threshold pressure value Pb1 as the break threshold pressure value, which is less than Pm1 (Pm1≥Pb1).

In additional or alternative embodiments, the threshold change unit 43 is configured to lower the make threshold pressure value in response to detecting a break event. For example, in response to detecting a break event, the threshold change unit 43 changes the make threshold pressure value to a changed make threshold pressure value Pm2 (e.g., a second make threshold pressure value) that is set to a value of a predetermined amount that is smaller than the initial value Pm1 (e.g., a first make threshold pressure value). Moreover, in the case where the make threshold is lowered by the predetermined amount and then a predetermined condition is satisfied, the threshold change unit 43 changes the make threshold pressure value from the changed make threshold pressure value Pm2 to the initial make threshold pressure value Pm1 and changes the lowered make threshold pressure value to the original make threshold pressure value. As a result, in the case of a multi-click operation in which multiple clicks are made consecutively, the make threshold pressure value used to detect second and subsequent rounds of make events is set to a make threshold pressure value that is lower than the make threshold pressure value used to detect a first round of a make event.

In further additional or alternative embodiments, the threshold change unit 43 may also lower the break threshold pressure value in conjunction with the lowering of the make threshold pressure value. For example, the threshold change unit 43 can change the break threshold pressure value to the changed break threshold pressure value Pb2, which is set to a value a predetermined amount smaller than the initial break threshold pressure value Pb1, in conjunction with the lowering of the make threshold pressure value. Further, the threshold change unit 43 may change the break threshold pressure value to the initial break threshold pressure value Pb1, which is the original threshold pressure value, in tandem with changing the above-described make threshold pressure value to the initial make threshold pressure value Pm1, which is the original make threshold pressure value. As a result, the break threshold pressure value used to detect second and subsequent rounds of break events will also be set to a value lower than the break threshold pressure value used to detect a first round of a break event.

The following description is made with reference to the threshold change unit 43 reducing the make threshold pressure value and the break threshold pressure value in response to detecting a break event. Further, in response to reducing the make threshold pressure value and the break threshold pressure value, the threshold change unit 43 changes the make threshold pressure value and the break threshold pressure value to the original threshold pressure values (e.g., the initial make and break threshold pressure values) when a preset threshold change period has elapsed from the detection of the break event.

The initial make threshold pressure value Pm1 and the changed make threshold pressure value Pm2 and the corresponding initial break threshold pressure value Pb1 and the changed break threshold pressure value Pb2 can be appropriately set according to the size, shape, material, or main usage of the pressure-sensitive touchpad 6 and/or the information processing apparatus (e.g., laptop PC 1) to which the various embodiments disclosed herein are applied. Moreover, since there is an individual difference in the pressure value depending on the user, the pressure values in past uses of the laptop PC 1 may be recorded/stored for each user so that initially set make and break threshold pressure values can be automatically corrected and set on the basis of the past use or uses.

Figure 5:
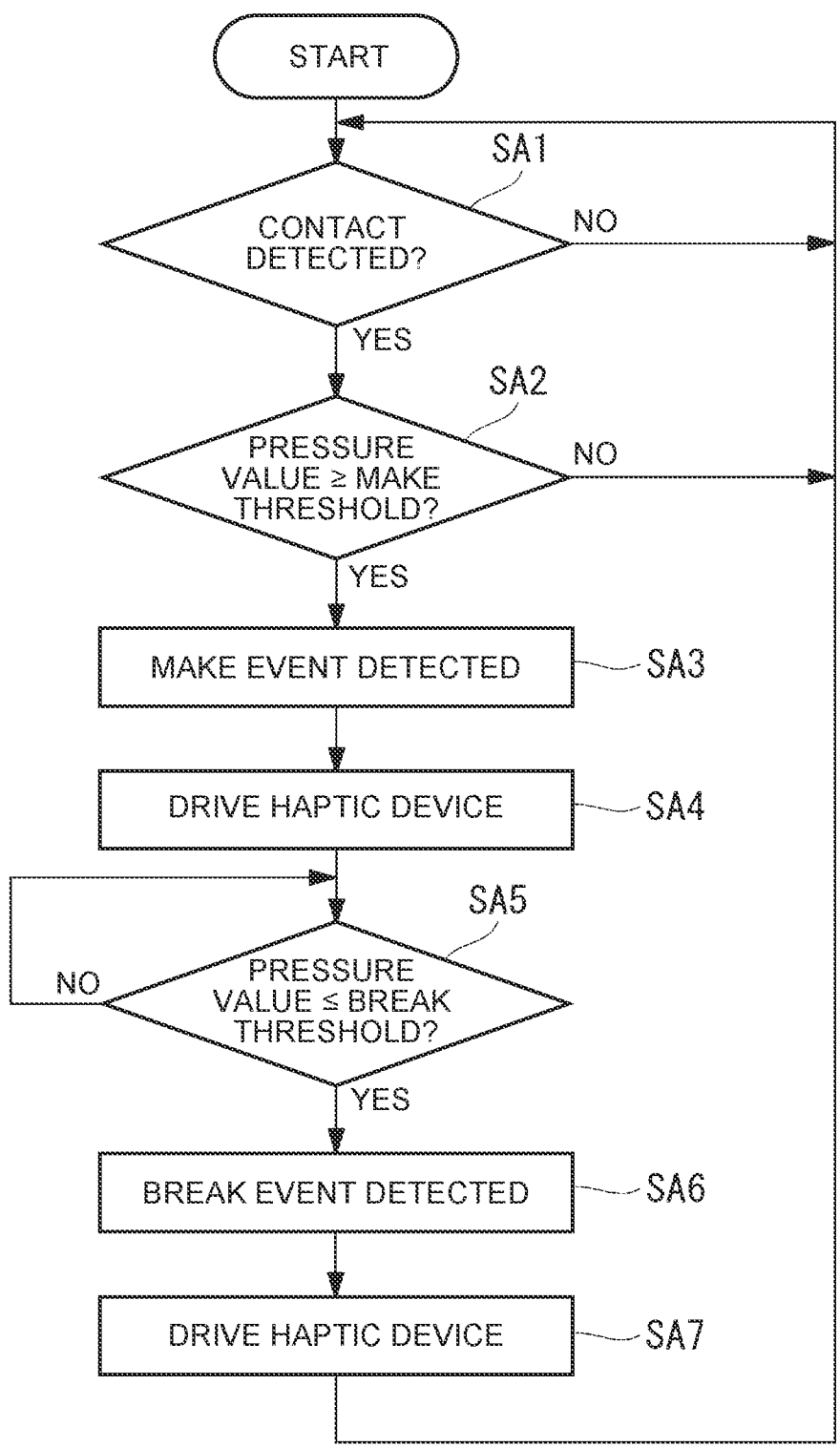
FIG. 5 is a flowchart diagram illustrating one embodiment of a method for detecting inputs to a laptop PC (e.g., an information handling device)
Figure 6:
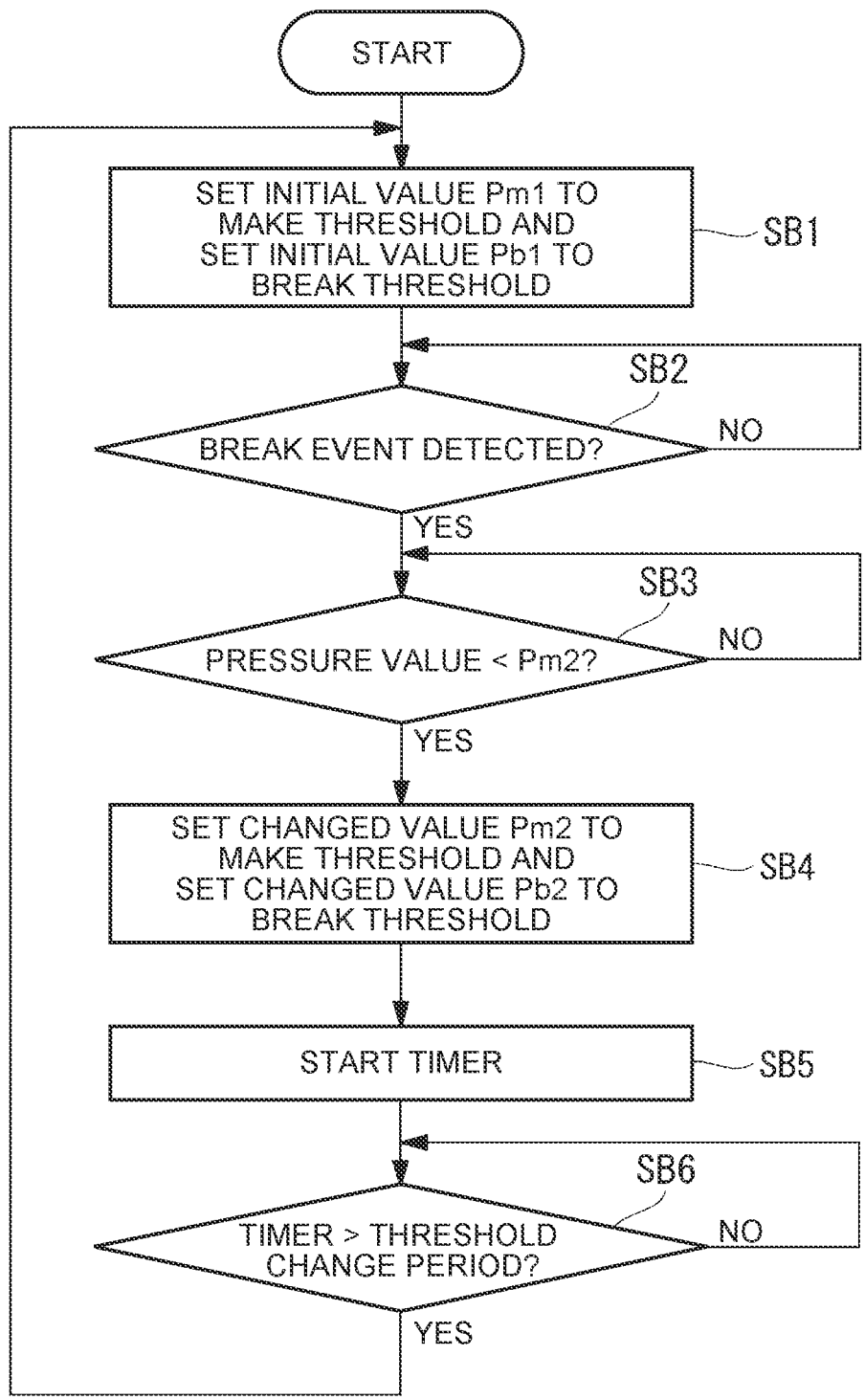
FIG. 6 is a flowchart diagram illustrating one embodiment of a method for performing a threshold change process.

Subsequently, an input detection method according to one embodiment is described herein with reference to FIG. 5. FIG. 5 is a flowchart diagram illustrating one embodiment of a method for an input detection process. Further, FIG. 6 is a flowchart diagram illustrating one embodiment of a method for a threshold change process, which can be performed in parallel with the method discussed with reference to FIG. 5. First, the input detection method will be described with reference to FIG. 5 and then the threshold pressure value change method will be described with reference to FIG. 6.

The input detection method discussed with reference to FIG. 5 starts with the booting of the laptop PC 1 as a trigger, for example. In response to the pressure sensor 33 detecting a contact of the pointing body with the pressure-sensitive touchpad 6 (block SA1), the pressure sensor 33 determines whether the pressure value detected by the pressure sensor 33 is greater than or equal to the make threshold pressure value (block SA2).

In response to the pressure value being less than the make threshold (e.g., a "NO" in block SA2), the pressure sensor 33 determines that the detected contact is not intended for a user's click operation, and the process returns to block SA1. On the other hand, in response to the pressure value detected by the pressure sensor 33 being greater than or equal to the make threshold pressure value (e.g., a "YES" in block SA2), a make event is detected (block SA3) and a signal that drives the haptic device 34 is output upon the detection of the make event (block SA4).

The pressure sensor 33 then determines whether a subsequent pressure value detected by the pressure sensor 33 is less than or equal to the break threshold pressure value (block SA5). In response to the pressure sensor 33 determining that the subsequent pressure value detected by the pressure sensor 33 is not less than or equal to the break threshold pressure value (e.g., a "NO" in block SA5), the touching pointing body (e.g., a user's finger) is not separated from the touch pad, the determination process of block SA6 is repeated until the pressure value decreases to the break threshold pressure value or less. On the other hand, response to the pressure sensor 33 determining that the subsequent pressure value detected by the pressure sensor 33 is less than or equal to the break threshold pressure value (e.g., a "YES" in block), a break event is detected (block SA6), a signal for driving the haptic device is output upon the detection of this break event (block SA7), and the process returns to block SA1 described above.

Below, a threshold change method is described with reference to FIG. 6. The make threshold pressure value used in block SA2 and the break threshold pressure value used in block SA5 in FIG. 5 are appropriately set and changed in the threshold change process described below.

The threshold change method illustrated in FIG. 6 starts with the booting of the laptop PC 1 as a trigger, for example. First, the initial make threshold pressure value Pm1 is set and the initial break threshold pressure value Pb1 is set (block SB1).

A pressure sensor 33 determines whether a break event has occurred (block SB2), which corresponds to detecting a break event in block SA6 of the user feedback process illustrated in FIG. 5. In response to not detecting a break event (e.g., a "NO" in block SB2), the pressure sensor 33 continues to determine whether a break event has occurred in block SB2.

In response to detecting a break event (e.g., a "YES" in block SB2), the pressure sensor 33 determines whether the current pressure value is less than the changed make threshold pressure value Pm2 (block SB3). In response to the current pressure value being greater than or equal to the change make threshold pressure value Pm2 (e.g., a "NO" in block SB3), a standby state is maintained until the pressure value decreases to be smaller than the changed make threshold pressure value Pm2 in block SB3.

In response to the pressure value being less than the changed make threshold pressure value Pm2 (e.g., a "YES" in block SB3), the make threshold and the break threshold are lowered by a predetermined amount (block SB4). Specifically, the changed make threshold pressure value Pm2, which is a predetermined amount smaller than the initial make threshold pressure value Pm1, is set to the make threshold and the changed break threshold pressure value Pb2, which is a predetermined amount smaller than the initial break threshold pressure value Pb1, is set to the break threshold (block SB4).

A timer is then started (block SB5) and determines whether a threshold change period of time has elapsed from the detection of the break event (block SB6). In other words, determines whether the timer time has exceeded the threshold change period.

In response to determining that the threshold change period of time has elapsed (e.g., a "NO" in block SB6), the timer continues to determine whether the threshold change period of time has elapsed (e.g., block SB6 is repeated until the timer time has exceeded the threshold change period). In response to determining that the threshold change period of time has not elapsed (e.g., a "YES" in block SB6), the method returns to the block SB1 to set the initial make threshold pressure value Pm1 to the make threshold and to set the initial break threshold pressure value Pb1 to the break threshold. Thereby, the make threshold and the break threshold are reset before being lowered in the block SB4. Then, a standby state is maintained again until a break event is detected.

Figure 7:
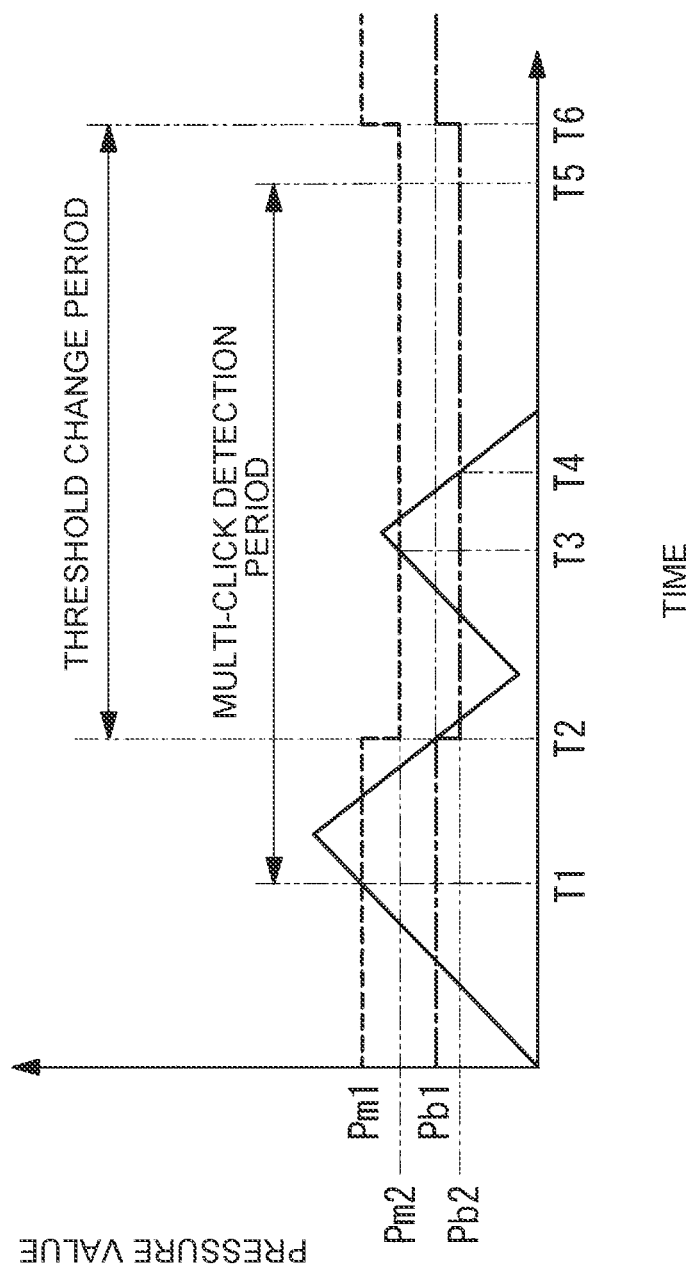
FIG. 7 is a timing diagram describing one embodiment of a threshold change process and detection timings of a make event and a break event.

The above-described input detection method and threshold change method are performed by the processor, thereby causing, for example, the detection of a make event, the detection of a break event, and changes of the make threshold and the break threshold, which is also illustrated in FIG. 7. Specifically, FIG. 7 is a timing diagram for describing the threshold change method and the detection time of a make event and a break event according to various embodiments. In FIG. 7, the horizontal axis represents time and the vertical axis represents a pressure value. Although FIG. 7 illustrates a situation in which the initial break threshold pressure value Pb1 is set to a value smaller than the changed make threshold pressure value Pm2, the various embodiments are not limited to this example. Depending on the utilization, the initial break threshold pressure value Pb1 threshold may be set to a value greater than the changed make threshold pressure value Pm2.

FIG. 7 illustrates that, at time T1, a make event is detected in response to the pressure value detected by the pressure sensor 33 being greater than or equal to the set initial make threshold pressure value Pm1. Upon the detection of the make event, the multi-click detection period starts to be timed from this point in time. Thereby, if a plurality of rounds of make events is detected within the multi-click detection period, the plurality of make events are determined to be a multi-click operation. If a make event is detected at the time T1, the haptic device 34 is driven and vibration occurs.

Subsequently, at time T2, in response to the pressure value detected by the pressure sensor 33 being less than or equal to the initial break threshold pressure value Pb1, which is set as the break threshold, a break event is detected. Upon detecting the break event, the haptic device 34 is driven and vibration occurs.

In addition, along with the detection of the break event, the make threshold pressure value is changed from the initial make threshold pressure value Pm1 to the changed make threshold pressure value Pm2 and the break threshold is changed from the initial break threshold pressure value Pb1 to the changed break threshold pressure value Pb2. As a result, the make threshold and the break threshold are lowered by a predetermined amount.

Subsequently, at time T3, in response to the pressure value detected by the pressure sensor 33 being greater than or equal the changed make threshold pressure value Pm2, which is set as the make threshold, a make event is detected and accordingly the haptic device 34 is driven and vibration occurs. At time T4, in response to the pressure value detected by the pressure sensor 33 being less than or equal to the changed break threshold pressure value Pb2, which is set as the break threshold, a break event is detected and accordingly the haptic device is driven and vibration occurs.

The multi-click detection period ends at time T5. Thereby, for example, there is performed processing according to the quantity of clicks input to the OS within the multi-click detection period.

At time T6, in response to the threshold change period elapses from the time T2 when the first break event is detected, the make threshold is reset from the changed make threshold pressure value Pm2 to the initial make threshold pressure value Pm1 and the break threshold is reset from the changed break threshold pressure value Pb2 to the initial break threshold pressure value Pb1. Thereby, the next make event detection and break event detection are determined using the initial make and break threshold pressure values.

As described above, according to the input device and the input detection g method thereof in various embodiments, the make event detector 40 uses the initial make threshold pressure value Pm1 (e.g., a first threshold) as a make threshold for use in detecting the first round of a make event and uses the changed make threshold pressure value Pm2 (e.g., a second threshold), which is smaller than the initial make threshold pressure value Pm1, as a make threshold for use in detecting the second and subsequent rounds of make events, in the case of detecting the make event(s) within a predetermined multi-click detection period. The various embodiments enable a user to feel the pressing force required for the second and subsequent click operations to be smaller than that for the first click operation, thereby enabling a reduction in the user's feeling of fatigue during multi-click input operations.

In addition, in response to a predetermined condition being satisfied after the make threshold is lowered, for example, such as after the threshold change period elapses from the time when the make threshold is lowered, the lowered make threshold is change to the original make threshold pressure value. Therefore, detection of the first round of the make event that occurs thereafter is determined using the initial make threshold pressure value, which enables the user to obtain a stable feeling during input operations.

Although the make threshold and the break threshold are changed at the same time in certain embodiments, other embodiments include the break threshold being changed after the make threshold is changed during the change timing of the break threshold. For example, the value of the break threshold may be changed after a predetermined time has elapsed from the change of the make threshold.

Further, although the make threshold is changed at the time of detection of a break event in various embodiments, the change timing of the make threshold is not limited thereto. For example, the make threshold may be changed at a predetermined time during the period from the detection of a make event to the detection of a break event. For example, as shown in the timing diagram illustrated in FIG. 8, the make threshold may be changed from the initial make threshold pressure value Pm1 to the changed make threshold pressure value Pm2 at a predetermined time in the period from the time T1 when the make event is detected to the time T3 when the break event is detected.

Figure 8:
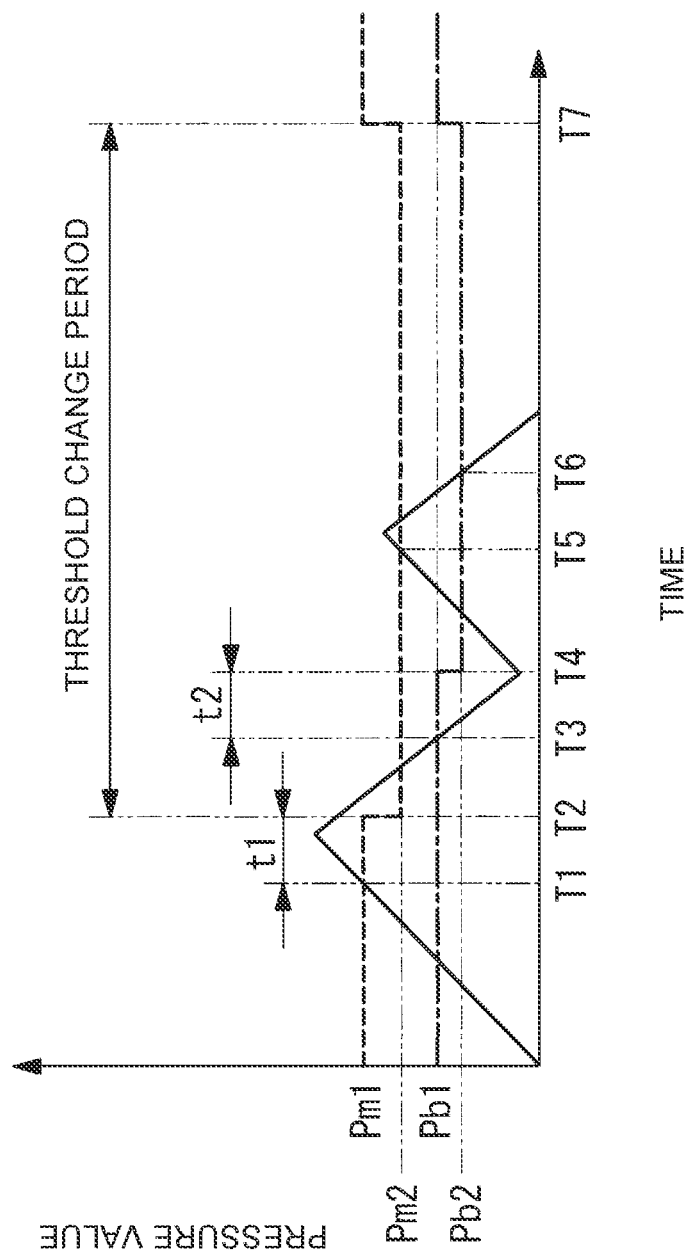
FIG. 8 is a timing diagram illustrating another embodiment of a threshold timing change in a threshold change process.

FIG. 8 illustrates an example situation of changing the make threshold from the initial make threshold pressure value Pm1 to the changed make threshold pressure value Pm2 at the time T2 when a predetermined time period t1 has elapsed from the time T1 when the make event is detected. Moreover, the change timing of the break threshold is not limited to a particular amount of time. For example, as illustrated in FIG. 8, the break threshold may be changed from the initial break threshold pressure value Pb1 to the changed break threshold pressure value Pb2 at the time T4 when a predetermined time period t2 has elapsed after the break event is detected at the time T3. Further, the predetermined time periods t1 and t2 may be the same amount of time or different amounts of time.

Further, the start time for timing the threshold change period in this example can also be set appropriately. Although FIG. 8 illustrates the time T2 when the make threshold is changed at the start time of the threshold change period, the various embodiments are not limited thereto. For example, the timer may be started at an arbitrary time between when the make threshold is detected (e.g., time T1) and when the break threshold is changed (e.g., time T4). Specifically, there are the following times: when the make event is detected (e.g., time T1), the change time of the make threshold (e.g., time T2), the time when the break event is detected (e.g., time T3), the change timing of the break threshold (e.g., time T4), and the like times. Here, the length of the threshold change period may be appropriately set according to the start time of the threshold change period.

In addition, the "threshold change period" may be set according to a multi-click detection period, which is used for determining multi-click operations. For example, the threshold change period may be set so that the end time of the threshold change period is the same time as the end time of the multi-click detection period and/or so that the end time of the threshold change period is later than the end time of the multi-click detection period.

Further, instead of or in addition to the above examples, the threshold change unit 43 may change the make threshold from the changed make threshold pressure value Pm2 to the initial make threshold pressure value Pm1 with the end time of the multi-click detection period. This change enables the end time of the multi-click detection period to be matched with the return time of the make threshold.

In other embodiments, regarding the change timing of a make threshold, the make threshold may be changed at a predetermined time in the period from the detection of a break event to the detection of the next make event. For example, as shown in the timing diagram illustrated in FIG. 9, the make threshold may be changed from the initial make threshold pressure value Pm1 to the changed make threshold pressure value Pm2 at a predetermined time in a time period that includes time T2 to time T4.

Figure 9:
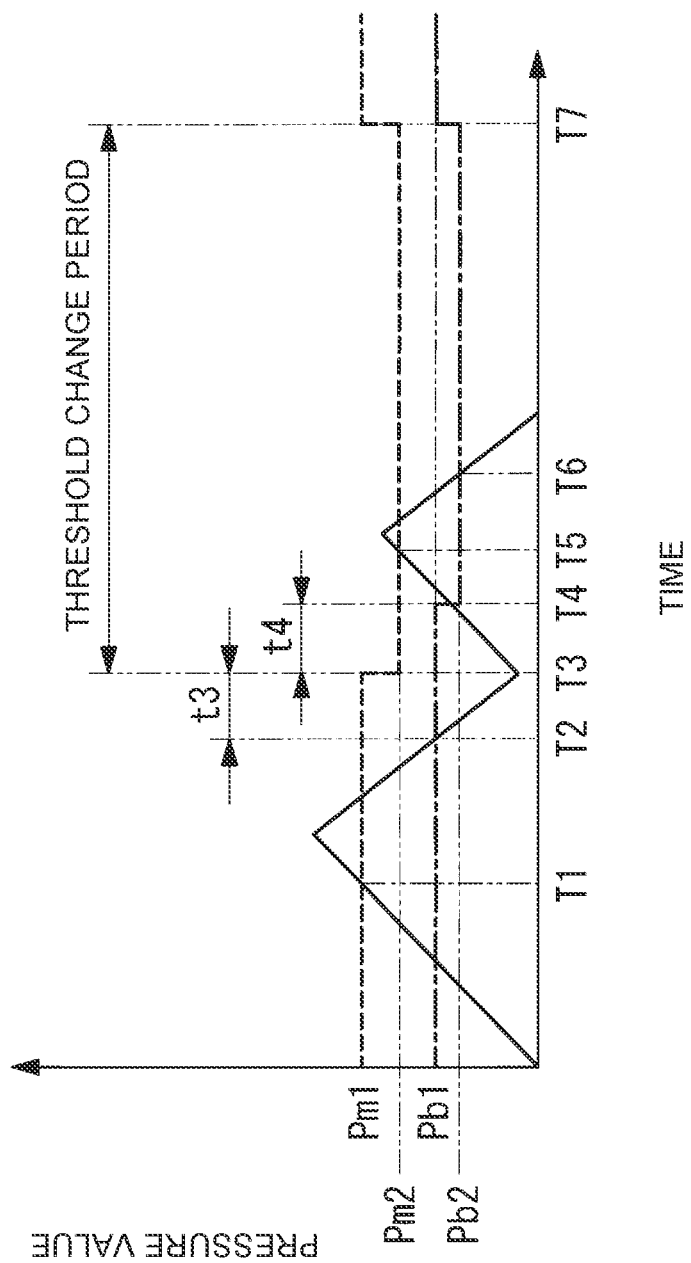
FIG. 9 is a timing diagram illustrating yet another embodiment of a threshold timing change in a threshold change process.

As an example, FIG. 9 illustrates a situation of changing the make threshold from the initial make threshold pressure value Pm1 to the changed make threshold pressure value Pm2 at time T3 when a predetermined time period t3 has elapsed after the break event is detected at the time T2. Moreover, the change timing of the break threshold is not limited to such embodiments. For example, as illustrated in FIG. 9, the break threshold may be changed from the initial break threshold pressure value Pb1 to the changed break threshold pressure value Pb2 at the time T4 when a predetermined time period t4 has elapsed after the make threshold is changed at the time T3. Further, the predetermined time periods t3 and t4 may include the same amount of time or different amounts of time.

Additionally, the start time for timing the threshold change period in this example can be appropriately set. Although the example shown in FIG. 9 illustrates the time T3 when the make threshold is changed as the start time of the threshold change period, the various embodiments are not limited thereto. For example, the timer may be started at an arbitrary time between when the make threshold is detected (e.g., time T1) and when the break threshold is changed (e.g., time T4). Specifically, arbitrary times can includes, for example, when the make event is detected (e.g., time T1), the time when the break event is detected (e.g., time T2), the change time of the make threshold (e.g., time T3), the change time of the break threshold (e.g., time T4), and the like times. Here, the length of the threshold change period may be appropriately set according to the start time of the threshold change period of time.

In certain embodiments, the "threshold change period" may be set according to the multi-click detection period, which is used for determining multi-click operations. For example, the threshold change period can be set so that the end time of the threshold change period is the same time as the end time of the multi-click detection period and/or so that the end time of the threshold change period is later than the end time of the multi-click detection period. Further, instead of or in addition to the above example(s)/embodiment(s), the threshold change unit 43 may change the make threshold from the changed make threshold pressure value Pm2 to the initial make threshold pressure value Pm1 at the end time of the multi-click detection period, which enables the end time of the multi-click detection period to be matched with the return time of the make threshold.

Figure 10:
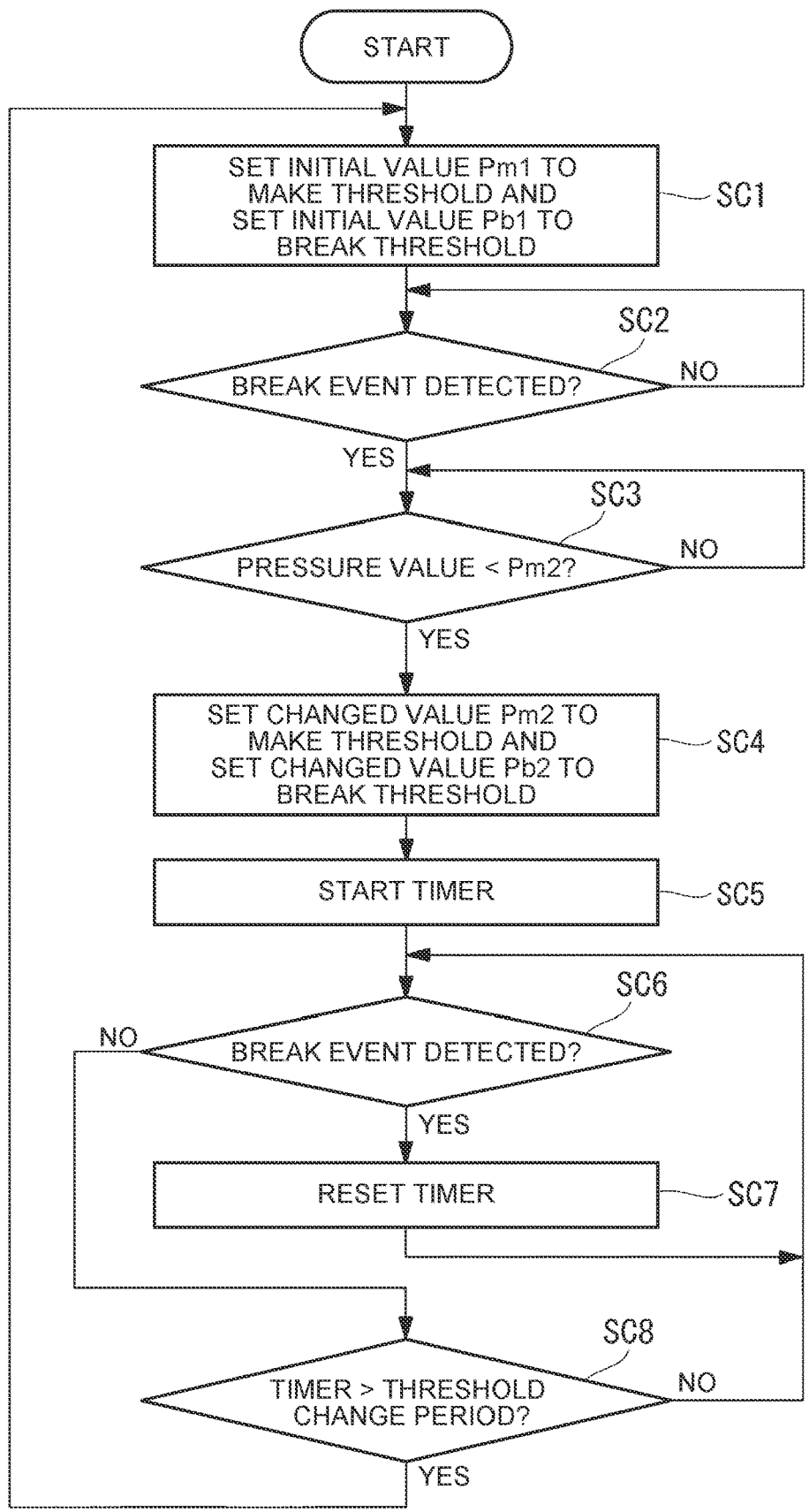
FIG. 10 is a flowchart diagram illustrating another embodiment of a method for performing a threshold change process.
Figure 11:
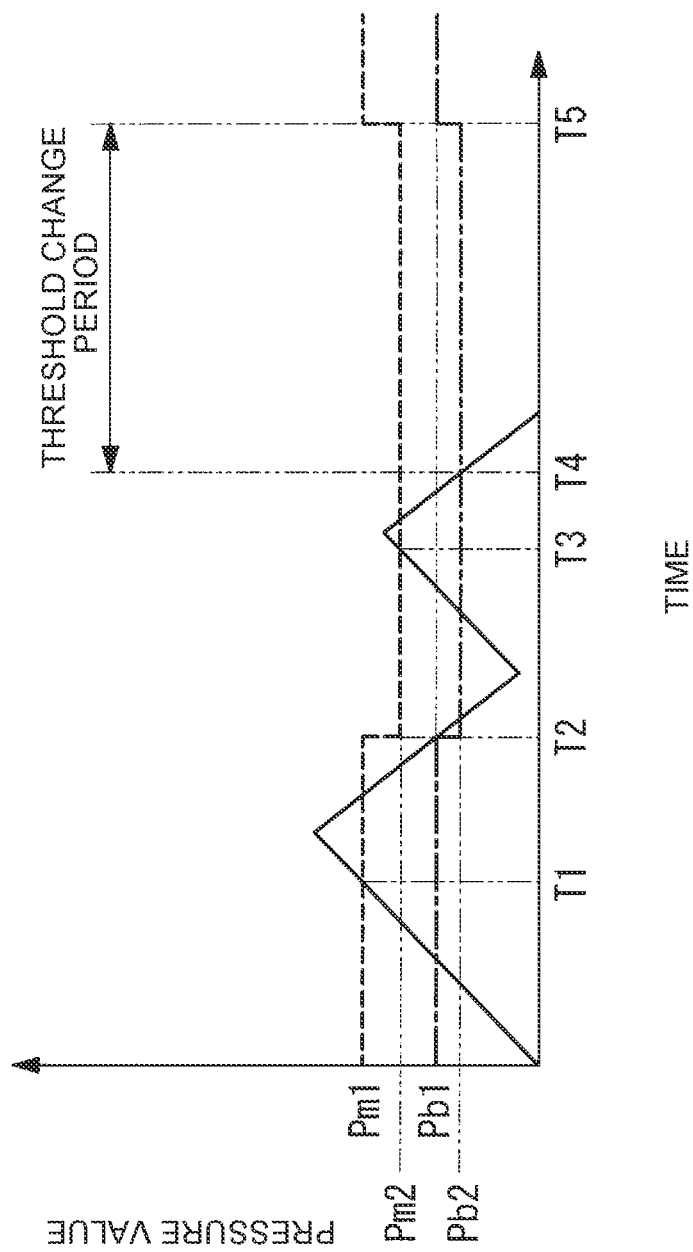
FIG. 11 is a timing diagram describing another embodiment of a threshold change process and detection timings of a make event and a break event.

The following disclosure with reference to FIGS. 10 and 11 describes an input device and an input detection method thereof according to another embodiment. Hereinafter, the description of the same points as those of the embodiments described above will be omitted and the different points will be mainly described, regarding the input device and the input detection method thereof according to this embodiment.

FIG. 10 is a diagram illustrating one embodiment of a processing method for a threshold change process. The threshold change method illustrated in FIG. 10 starts, for example, with the booting of the laptop PC 1 as a trigger.

First, the initial make threshold pressure value Pm1 is set to the make threshold and the initial break threshold pressure value Pb1 is set to the break threshold (block SC1). The pressure value is monitored to determine whether a make event has occurred (block SC2).

In response to not detecting a break event (e.g., a "NO" in block SC2), a monitoring state is maintained until a break event is detected. In response to detecting a break event (e.g., a "YES" in block SC2) (see also, block SA6 of the user feedback process illustrated in FIG. 5), a determination of whether the current pressure value is smaller than the changed make threshold pressure value Pm2 (block SC3).

In response to the pressure value being greater than the changed make threshold pressure value Pm2 (e.g., a "NO" in block SC3), a standby state is maintained until the pressure value decreases to be less than the changed make threshold pressure value Pm2. In response to the pressure value being less than the changed make threshold value Pm2 (e.g., a "YES" in block SC3), the make threshold and the break threshold are lowered by a predetermined amount. Specifically, the changed make threshold pressure value Pm2, which is a predetermined amount less than the initial make threshold pressure value Pm1, is set to the make threshold and the changed break threshold pressure value Pb2, which is a predetermined amount less than the initial break threshold pressure value Pb1, is set to the break threshold (block SC4).

Subsequently, a timer is started (block SC5) and a determination of whether a break event is detected before the timer time has exceeded a threshold change period is performed (block SC6). In response to detecting a break event before the timer time has exceeded the threshold change period (e.g., a "YES" is block SC6), the timer is reset (block SC7) and the method returns to block SC6. That is, unless the timer time has exceeded the threshold change period, the method returns to the block SC6 to determine whether a break event is detected.

In response to not detecting a break event before the timer time has exceeded the threshold change period (e.g., a "NO" is block SC6), a determination of whether the timer time has exceeded the preset threshold change period is performed (block SC8). In response to the timer time not exceeding the preset threshold change period (e.g., a "NO" in block SC8), the method returns to the block SC6 to determine whether a break event is detected.

In response to the timer time exceeding the preset threshold change period (e.g., a "YES" in block SC8), the method returns to the block SC1 to set the initial make threshold pressure value Pm1 to the make threshold and the initial break threshold value Pb1 to the break threshold. That is, the method returns to the block SC1 unless a break event is detected before the timer time has exceeded the threshold change period. Thereby, the make threshold and the break threshold are reset to their respective values before being lowered in the block SC4. Then, a standby state is maintained again until a break event is detected.

The above-described input detection method and threshold change method are performed by the processor, thereby causing, for example, the detection of a make event, the detection of a break event, and/or changes to the make threshold and/or the break threshold as illustrated in FIG. 11. FIG. 11 is a timing diagram describing one embodiment of the threshold change method and the detection timing of a make event and a break event in which the horizontal axis represents time and the vertical axis represents a pressure value. Although FIG. 11 illustrates a situation in which the initial break threshold pressure value Pb1 is set to a value less than the changed make threshold pressure value Pm2, the various embodiments are not limited to this example. Depending on utilization, the initial break threshold pressure value Pb1 may be set to a value greater than the changed make threshold pressure value Pm2.

At time T1, a make event is detected in response to the pressure value detected by the pressure sensor 33 being greater than or equal to the initial make threshold pressure value Pm1 set as the make threshold. Upon the detection of the make event, a timing the multi-click detection period starts from this point of time (not illustrated). Thereby, in response to a plurality of rounds of make events being detected within the multi-click detection period, it is determined to be a multi-click operation. In response to a make event being detected at time T1, the haptic device 34 is driven and vibration occurs.

Subsequently, at time T2, in response to the pressure value detected by the pressure sensor 33 being less than or equal to the initial break threshold pressure value Pb1, which is set as the break threshold, a break event is detected. Upon detection of the break event, the haptic device 34 is driven and vibration occurs.

In addition, along with the detection of the break event, the make threshold is changed from the initial make threshold pressure value Pm1 to the changed make threshold pressure value Pm2 and the break threshold is changed from the initial break threshold pressure value Pb1 to the changed break threshold pressure value Pb2. As a result, the make threshold and the break threshold are lowered by a predetermined amount.

Subsequently, at time T3, in response to the pressure value detected by the pressure sensor 33 being greater than or equal to the changed make threshold pressure value Pm2, which is set as the make threshold, a make event is detected and the haptic device 34 is driven and vibration occurs. Further, at time T4, in response to the pressure value detected by the pressure sensor 33 being less than or equal to the changed break threshold pressure value Pb2, which is set as the break threshold, a break event is detected, and the haptic device is driven and vibration occurs.

In addition, detection of the break event resets the timer and the threshold change period starts to be timed anew from this point of time. Then, in response to the timer time exceeding the threshold change period without detection of a break event at time T5, the make threshold is reset from the changed make threshold pressure value Pm2 to the initial make threshold pressure value Pm1 and the break threshold is reset from the changed value break threshold pressure Pb2 to the initial break threshold pressure value Pb1, which causes the next make event detection and break event detection to be determined via using the initial values.

The threshold change period in various embodiments may be set to a time period different from the threshold change period of the various embodiments described above. Further, in certain embodiments, the timing to change the make threshold and to change the break threshold can be appropriately set. In other words, the make threshold may be changed at a predetermined time in a particular time period from the detection of a make event to the detection of a break event and/or may be changed at a predetermined time in a period of time from the detection of a break event to the detection of the next make event. Moreover, the break threshold may be changed at the same time as the change of the make threshold or may be changed later than the change of the make threshold. Moreover, the reset timing of the threshold change period is not limited to the above examples, but a proper timing can be appropriately set.

Although specific embodiments of the present technology have been described hereinabove, the technical scope of the various embodiments is not limited to the scope described in the above embodiments. A wide variety of modifications or improvements can be applied to the above embodiments without departing from the scope of the present technology, and the embodiments to which such modifications or improvements have been applied are also included in the technical scope of this disclosure.

The flow of the input detection method and/or the threshold change method described in each of the above embodiments are also examples, and one or more unnecessary processes may be deleted, one or more new processes may be added, and the processing sequence may be changed without departing from the scope of the various embodiments.

For example, in each embodiment described above, description has been made based on the situation of changing the make threshold and the break threshold in one process. The make threshold and the break threshold, however, may be gradually reduced (e.g., each time a break event is detected within the multi-click detection period). In addition, the change timing of the make threshold and break threshold for the second and subsequent rounds is not limited to the break event detection timing. The change timing for the second and subsequent rounds may be appropriately set according to the change timing of the make threshold for the first round and the break threshold for the first round. Further, each of the amounts and/or quantities of decrease in the make threshold and/or the break threshold may be appropriately set and the amount of decrease in the make threshold may be different from the amount of decrease in the break threshold.

Although the above embodiments are described with respect to a situation in which the haptic device 34 is the actuator 34A that causes vibration, the various embodiments are not limited thereto. For example, the haptic device 34 may be configured to generate electrical stimulation on a finger by electric current (or voltage) instead of the actuator 34A. Further, the pad controller 35 does not necessarily have to drive the haptic device 34 in synchronization with all make events and break events. That is, the haptic device 34 may not be driven by a user's selective setting.

Although the above embodiments are described with respect to a situation in which the pressure sensor 33 is a pressure sensor, the various embodiments are not limited thereto. That is, the pressure sensor 33 may be another sensor such as, for example, a capacitive sensor that detects a contact area. In situation in which the pressure sensor 33 is a capacitive sensor, the contact areas may be set, instead of pressure values, as the above make threshold and break threshold.

Further, although the above embodiments are described with respect to a situation in which the information processing apparatus is a laptop PC, the various embodiments are not limited thereto. That is, an information processing apparatus (or information handling device) may also include, but is not limited to, a desktop PC, a tablet PC, a personal digital assistance (PDA), or other similar devices/systems. Moreover, an input device is not limited to the pressure-sensitive touchpad 6, but may be, for example, an input device of a game console or an input device provided in an Internet of Things (IoT) device, and the input device can be widely applied to any device that functions as a user interface.

While the present technology has been described in each form, the technical scope of the present technology is not limited to the scope of the above-described aspects and various combinations, changes, or improvements can be added without departing from the scope of the technology. The forms to which the combinations, changes, or improvements are added shall also be included in the technical scope of the present technology.

Embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

The invention claimed is:

1. A system, comprising:
a pressure sensor configured to detect a set of physical touches indicating a pressed state of a pointing body on an operation surface of a computing device; and
a controller configured to detect inputs of the pointing body based on the set of physical touches indicating the pressed state detected by the pressure sensor,
wherein:
the controller comprises a make event detector configured to detect a make event comprising a first physical touch including a first pressure value that is greater than or equal to a make threshold pressure value based on the detected user inputs, and
the make event detector is configured to:
utilize a first threshold within a first predetermined multi-click detection period of time for multi-click operations as the make threshold for use in detecting a first round of the make event, and
in response to detecting a break event, utilize a second threshold, which is less than the first threshold, as the make threshold for use in detecting subsequent rounds of the make event within the first predetermined multi-click detection period of time for multi-click operations to reduce user fatigue during multi-click operations.

2. The system of claim 1, wherein the controller includes a threshold change device that changes the first threshold to the second threshold at a predetermined timing in response to detecting the first round of the make event.

3. The system of claim 2, wherein:
the controller comprises a break event detector configured to detect a break event including a second physical touch including a second pressure value that is less than or equal to a break threshold, which is a value less than or equal to the make threshold, after the make event is detected; and
the threshold change device is configured to change the first threshold to the second threshold at a predetermined timing in a period from detection of the make event to detection of the break event in response to one of detection of the break event and after a predetermined period has elapsed from detection of the break event.

4. The system of claim 2, wherein the threshold change device is further configured to set the first threshold to the make threshold in response to a predetermined condition being satisfied after changing the first threshold to the second threshold.

5. The system claim 2, wherein the threshold change device is configured to set the first threshold to the make threshold in response to setting the second threshold to the make threshold and elapse of a preset threshold change period from detection of the make event using the first threshold.

6. The system of claim 2, wherein:
the controller further includes a break event detector configured to detect a break event after detecting the make event, the break event including a second physical touch that includes a second pressure value that is less than or equal to a break threshold, which is a value less than or equal to the make threshold; and
the threshold change device sets the first threshold to the make threshold in response to elapse of a preset threshold change period from detection of the break event.

7. The system of claim 2, wherein the threshold change device is configured to set the first threshold to the make threshold in response to elapse of a preset threshold change period from a point of time in which the first threshold is changed to the second threshold.

8. The system of claim 7, wherein:
the threshold change period is modifiable; and
the threshold change period is set according to a multi-click detection period used to determine multi-click operations.

9. The system of claim 2, wherein the threshold change device is configured to set the first threshold to the make threshold at an end time of a multi-click detection period used for determining multi-click operations.

10. The system of claim 2, wherein the controller further comprises:
- a break event detector configured to detect a break event including a second physical touch including a second pressure value less than or equal to a break threshold, which is a value equal to or less than the make threshold, after the make event is detected; and
- a timer, wherein:
- the controller is configured to reset the timer in response to detecting the break event before a threshold change period has elapsed; and
- the controller sets the first threshold to the make threshold in response to a timer time exceeding the threshold change period.

11. The system of claim 1, wherein:
the controller further comprises a break event detector configured to detect a break event including a second physical touch including a second pressure value that is less than or equal to a break threshold, which is a value less than or equal to the make threshold, after the make event is detected; and
the break event detector is configured to utilize a first break threshold as a break threshold for use in detecting a first round of the break event and uses a second break threshold, which is less than the first break threshold, as the break threshold for use in detecting subsequent rounds of the break event, in the case of detecting a plurality of break events within a second predetermined multi-click detection period of time.

12. The system of claim 1, further comprising:
a feedback device configured to provide feedback to the pointing body pressing the operation surface,
wherein the controller further comprises a feedback controller configured to activate the feedback device in response to detection of the make event.

13. An apparatus, comprising:
a processor of an information handling device; and
a memory configured to store code executable by the processor to:
- detect user inputs based on a received set of physical touches of a pointing body pressing an operation surface of a computing device indicating a pressed state of the operation surface detected by a pressure sensor,
- detect a make event comprising a first physical touch including a first pressure value that is greater than or equal to a make threshold pressure value based on the detected user inputs,
- utilize a first threshold within a first predetermined multi-click detection period of time for multi-click operations as the make threshold for use in detecting a first round of the make event, and
- in response to detecting a break event, utilize a second threshold, which is less than the first threshold, as the make threshold for use in detecting subsequent rounds of the make event within the first predetermined multi-click detection period of time for multi-click operations to reduce user fatigue during multi-click operations.

14. The apparatus of claim 13, wherein the code executable further causes the processor to change the first threshold to the second threshold at a predetermined timing in response to detecting the first round of the make event.

15. The apparatus of claim 13, wherein the code executable further causes the processor to:
- detect a break event including a second physical touch including a second pressure value that is less than or equal to a break threshold, which is a value less than or equal to the make threshold, after the make event is detected; and
- utilize a first break threshold as a break threshold for use in detecting a first round of the break event and a second break threshold, which is less than the first break threshold, as the break threshold for use in detecting subsequent rounds of the break event, in the case of detecting a plurality of break events within a second predetermined multi-click detection period of time.

16. The apparatus of claim 13, wherein the code executable further causes the processor to provide feedback to the pointing body pressing the operation surface in response to detection of the make event.

17. A method, comprising:
- detecting, by an information handling device, user inputs based on a received set of physical touches of a pointing body pressing an operation surface of a computing device indicating a pressed state of the operation surface detected by a pressure sensor;
- detecting a make event comprising a first physical touch including a first pressure value that is greater than or equal to a make threshold pressure value based on the detected user inputs;
- utilizing a first threshold within a first predetermined multi-click detection period of time for multi-click operations as the make threshold for use in detecting a first round of the make event; and
- in response to detecting a break event, utilizing a second threshold, which is less than the first threshold, as the make threshold for use in detecting subsequent rounds of the make event within the first predetermined multi-click detection period of time for multi-click operations to reduce user fatigue during multi-click operations.

18. The method of claim 17, further comprising:
changing the first threshold to the second threshold at a predetermined timing in response to detecting the first round of the make event.

19. The method of claim 17, further comprising:
- detecting a break event including a second physical touch including a second pressure value that is less than or equal to a break threshold, which is a value less than or equal to the make threshold, after the make event is detected; and
- utilizing a first break threshold as a break threshold for use in detecting a first round of the break event and a second break threshold, which is less than the first break threshold, as the break threshold for use in detecting subsequent rounds of the break event, in the case of detecting a plurality of break events within a second predetermined multi-click detection period of time.

20. The method of claim 17, further comprising:
providing feedback to the pointing body pressing the operation surface in response to detection of the make event.

* * * * *